United States Patent [19]
Fletcher et al.

[11] 3,771,040
[45] Nov. 6, 1973

[54] REGULATED DC-TO-DC CONVERTER FOR VOLTAGE STEP-UP OR STEP-DOWN WITH INPUT-OUTPUT ISOLATION

[76] Inventors: James C. Fletcher, Administrator of the National Aeronautics and Space Administration with respect to an invention of; Sam Yun-Ming Feng; Thomas G. Wilson, both of Durham, N.C.

[22] Filed: Apr. 18, 1972

[21] Appl. No.: 245,063

[52] U.S. Cl. ............... 321/2, 321/18, 321/45 S, 323/DIG. 1, 331/62, 331/113 A
[51] Int. Cl. ............................................. H02m 3/32
[58] Field of Search ................... 321/2, 18, 45 S; 331/113 A, 62; 323/DIG. 1

[56] References Cited
UNITED STATES PATENTS

| | | | |
|---|---|---|---|
| 3,675,115 | 7/1972 | O'Loughlin | 321/2 X |
| 3,646,578 | 2/1972 | Gregory | 331/113 A X |
| 3,297,960 | 1/1967 | Massey | 331/113 A |
| 3,388,309 | 6/1968 | Banks et al. | 321/2 |
| 3,602,801 | 8/1971 | Williamson | 321/2 |

OTHER PUBLICATIONS
IEE; April 1960, (Paper No. 2984E) Author: Towers, Pg. 1373–1382 (Pg. 1379, 1380 relied upon).

*Primary Examiner*—Gerald Goldberg
*Attorney*—Monte F. Mott et al.

[57] ABSTRACT

A closed-loop regulated dc-to-dc converter employing an unregulated two-winding inductive-energy storage converter is provided by using a magnetically coupled multivibrator acting as a duty-cycle generator to drive the converter. The multivibrator is comprised of two transistor switches and a saturable transformer. The output of the converter is compared with a reference in a comparator which transmits a binary zero until the output exceeds the reference. When the output exceeds the reference, the binary output of the comparator drives transistor switches, via a dc isolation circuit, which control the multivibrator to turn the multivibrator off. The multivibrator is unbalanced so that a predetermined transistor will always turn on first when the binary feedback signal becomes zero.

6 Claims, 10 Drawing Figures

REGULATED DC-TO-DC CONVERTER FOR VOLTAGE STEP-UP OR STEP-DOWN WITH INPUT-OUTPUT ISOLATION

ORIGIN OF THE INVENTION

The invention described herein was made in the performance of work under a NASA contract and is subject to the provisions of Section 305, of the National Aeronautics and Space Act of 1958, Public Law 85-568 (72 Stat. 435; 42 USC 2457).

BACKGROUND OF THE INVENTION

This invention relates to a closed-loop regulated dc-to-dc power converter, and more particularly to a binary voltage controlled duty-cycle generator for use in a regulated dc-to-dc power converter using a binary comparator in the voltage feedback to the duty-cycle generator to adjust the duty period of the generator.

Dc-to-dc converters operating at switching frequencies up to 100 kHz have been proposed and designed when efficiency has been of secondary consideration. When converters have been designed to optimize efficiency, size and weight, switching frequencies in the low-kilohertz range of 2 to 20 kHz have been employed. However, there are cases in which the electromagnetic radiation generated by conversion frequencies in this audio frequency range and their attendant harmonics have strongly interfered with a frequency band desired for some other purpose. Similar difficulties with interference between frequencies desired for scientific measurements and for power conversion are anticipated in the case of some measurements in the hundreds of kilohertz.

Perhaps one of the safest ways to avoid such interference is to require that the minimum conversion frequency for all power converters be higher than the highest frequency to be measured by any of the scientific experiments. Therefore, development of closed-loop regulated dc-to-dc converters with conversion frequencies in the low-megahertz range is highly desired with the hope of eliminating any possible electromagnetic-radiation interference and also with the attendant potential of reducing converter size and weight and of improving converter response times.

Converter specifications usually are dictated by the application requirements, reliability, various optimizations and design criteria. Nevertheless, general requirements are for high efficiency, small converter size and weight, good output-voltage regulation, small output ripple, self-starting capability, and the capacity to withstand wide load variations. Additional requirements such as input-output isolation, conversion-frequency restrictions, minimum use of magnetic materials, shorter converter response times, and the ability of stepping up and of stepping down the input voltage to a regulated output voltage are highly desirable features in many circumstances, even if not always specifically required. In the present invention, the primary requirement is for conversion frequencies in the low-megahertz range while converter efficiency, size, weight, etc., are of secondary consideration.

Two commonly employed classes of dc-to-dc power converters are those that employ a parallel inverter with output rectifiers and those that employ inductive-energy-storage converter circuits sometimes referred to as flyback circuits or chopper voltage regulators with LC filters. The possibility of more severe power-transistor storage-time difficulties and the need of a greater number of power switches for parllel-inverter schemes led to the selection of energy-storage configurations as the basic power-conversion circuit to be used in the present invention. These circuits present less transistor storage-time problems; and fewer switches suggest the potential of higher converter reliability and efficiency.

SUMMARY OF THE INVENTION

Briefly, a closed-loop regulated dc-to-dc converter circuit is provided in accordance with the present invention using a two-winding inductive-energy-storage converter having an electronic switch and the primary winding of a two-winding inductive-energy-storage transformer in series between a source of unregulated dc voltage $E_i$ and source ground. Alternatively, a single winding flyback converter may be employed for either the voltage step-up or voltage step-down configuration. In any case, the converter chops the unregulated dc voltage and provides a filtered output voltage $E_o$. For the two-winding type, steady-state output voltage $E_o$ can be expressed according to the equation:

$$E_o = (N_s/N_p)(t_{on}/t_{off}) E_i$$

(1)

where $N_s/N_p$ is the secondary to primary turns ratio of the two-winding energy-storage transformer and $t_{on}/t_{off}$ is the ratio of the on and off times of the power switching transistor in the converter. That output is compared with a reference in a binary comparator which transmits a binary zero until the voltage output exceeds the reference by a predetermined small voltage $\delta_1$, at which time the comparator transmits a binary one. Means responsive to the binary output signal of the comparator controls the $t_{on}$ and $t_{off}$ periods of the converter. That means is comprised of a duty cycle generator in the configuration of a free-running magnetically coupled multivibrator and means to turn off the multivibrator. The multivibrator employs two transistor switches and a saturable transformer to provide magnetic coupling between the switches. An electronic control means is provided to turn the multivibrator on in response to binary zero from the comparator when the output voltage $E_o$ drops below the reference level by a predetermined small voltage $\delta_2$ and to turn the multivibrator off in response to a binary one from the comparator. The multivibrator on/off control means responds to the binary output signal of the comparator to effectively impress or remove a voltage derived from the unregulated power source from being applied to power the multivibrator. Bias in the circuits of the transistor switches in the multivibrator is unbalanced to force a given one of the transistors in the multivibrator to be the first one turned on whenever the voltage is initially impressed across the multivibrator. Electrical dc isolation is provided between the comparator and the on-off control means of the multivibrator.

The novel features that are considered characteristic of this invention are set forth with particularity in the appended claims. The invention will best be understood from the following description when read in connection with the accompanying drawings.

BRIEF DESCRIPTION OF THE INVENTION

DESCRIPTION OF PREFERRED EMBODIMENTS

Figure 1:
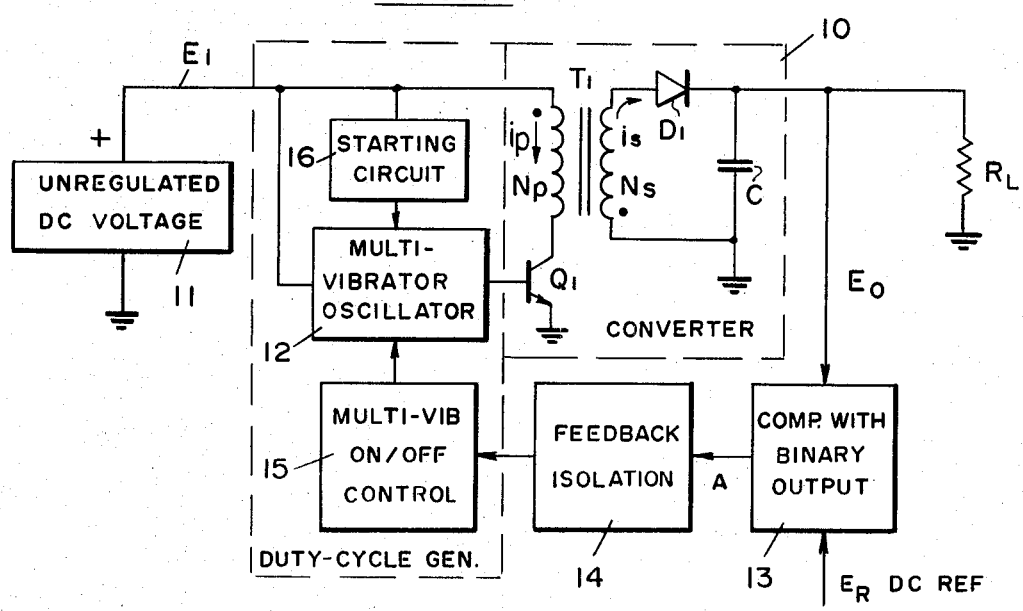
FIG. 1 is a block diagram of the present invention.

Referring to FIG. 1, a block diagram is shown of the present invention employing a two-winding energy-storage converter 10 capable of both stepping up and stepping down a voltage from an unregulated source 11 according to the Equation (1) set forth hereinbefore, where the ratio of $t_{on}$ to $t_{off}$ pertains to the periods a power transistor $Q_1$ is alternately on and off under control of a multivibrator 12. The output of the multivibrator consists of voltage pulses which determine the duty cycle of the converter transistor switch $Q_1$.

The turns ratio $N_s/N_p$ of the secondary winding of a two-winding transformer $T_1$ to the primary winding thereof is selected to permit the desired voltage step-up or step-down to be slightly exceeded for the conditions of minimum voltage from source 11 and of a $t_{on}/t_{off}$ ratio corresponding to the free running condition of the multivibrator. Adjusting the time ratio then permits regulation of the voltage $E_o$ to a constant value while the input voltage $E_i$ and the output power to a load $R_L$ vary over rather wide limits. The regulated output voltage $E_o$ may be either higher than, equal to, or lower than the input voltage $E_i$.

Figure 2:
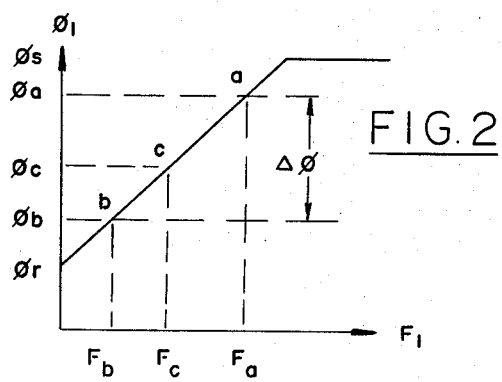
FIG. 2 is a graph showing the flux versus $mmf$ characteristic of a transformer in a converter for the invention.

The transformer $T_1$ utilizes a core with a linear flux $\phi_1$ versus magnetomotive force $F_1$ characteristic as shown in FIG. 2. As shown in FIG. 1, the transistor $Q_1$ is used as an electronic switch and is cyclically turned on and off by the output from the multivibrator 12. Energy is stored inductively in the power-transformer core $T_1$ by means of primary current $i_p$ when the transistor $Q_1$ is turned on. During this time, diode $D_1$ is reverse biased and no secondary current $i_s$ flows. When transistor $Q_1$ is turned off, the primary current $i_p$ is interrupted suddenly. Since the $mmf$ $F_1$ cannot change instantaneously, a current must flow through the secondary winding $N_s$. Diode $D_1$ is thus forward biased and the energy which previously was stored is delivered as output energy through the secondary winding.

It is important for later discussion to note that the output voltage $E_o$ is not a perfectly smooth dc voltage but an average dc level with small fluctuations or ripple voltage. The instantaneous value of the output voltage increases immediately after the transistor $Q_1$ is turned off while energy is being supplied through diode $D_1$ to charge the output capacitor C and to supply power to the load $R_L$. When the transistor $Q_1$ is turned on, the diode $D_1$ is reverse biased, and energy stored in the capacitor discharges with a time constant $R_LC$ to provide power to the load. During this time the instantaneous value of the output voltage decreases slightly.

Under the assumption that C is sufficiently large to make the output-voltage ripple small compared to $E_o$ and the assumption that the diode forward voltage drop and the saturation voltage of the transistor are negligible, the average steady-state output voltage $E_o$ can be shown to be related to the input voltage $E_i$ by Equation (1).

In order that the complete converter operate properly and Equation (1) hold true for all required line and load conditions, special attention must be paid to the selection of the magnetic core and windings for the energy-storage transformer $T_1$. Considerations and precautions relative to the design of this transformer are given in the following paragraphs in order that low-frequency instability of the closed-loop converter can be avoided.

It should be noted that only pure switching mode control is used in this invention. Therefore, each of the blocks in FIG. 1 can be designed separately with little worry of serious unanticipated difficulties arising when assembling them together for closed-loop operation.

As the input voltage $E_i$ and the output load $R_L$ are varied, the flux-excursion of the transformer $T_1$ migrates up and down the linear $\phi$–F characteristic shown in FIG. 2. In order that large surge currents in the power switch not occur and that Equation (1) hold true, both extremities $\phi_s$ and $\phi_r$ must be avoided.

Assume that the average value of the input current of $i_p$ over a full cycle is $I_{in}$ and that the average $i_p$ during $t_{on}$ only is $I_c$, then the two currents are related by $I_{in}(t_{on} + t_{off}) = I_c t_{on}$. The current $I_c$ in winding $N_p$ during $t_{on}$ can be expressed in terms of the output power $P_o$ and the approximate efficiency $\eta$ as $$I_c = [(t_{on} + t_{off})/t_{on}][P_o/\eta E_i] \tag{2}$$

The average flux density $B_c$ in the transformer is directly related to $I_c$ and is given by $B_c = \phi_c/A = \mu N_p I_c/l$, where $\mu$ is the permeability of the core, $l$ is the mean-magnetic-path length, and $A$ is the cross-sectional area. The total change in flux $\Delta\phi$ about this point is determined by the input voltage as $\Delta\phi = E_i t_{on}/N_p$. Using these relationships, the contraints reduce to $$(\mu N_p I_{cM}/l) + (\frac{1}{2})(E_{iM} t_{on}/N_p A) < B_s \tag{3}$$

$$(\mu N_p I_{cm}/l) - (\frac{1}{2})(E_{iM} t_{on}/N_p A) > B_r \tag{4}$$

where the subscripts $M$ and $m$ represent the maximum and the minimum value of the variable, respectively.

Precautions must be taken before automatically using Equations (3) and (4). First, the turns ratio $N_s/N_p$ should be carefully selected in order that the sum of the load voltage reflected across the primary winding and the maximum input voltage $E_{iM}$ is less than the power transistor $V_{CEO}$ rating so that transistor breakdown can be avoided. Second, the product of $(t_{on}/t_{off})(N_s/N_p)$ which appears in Equation (1) needs to be large enough to produce an unregulated target output voltage that is greater than the desired regulated magnitude at minimum input voltage and full load so that the converter will start. Third, the $t_{on}$ value used in Equations (3) and (4) should be the longest one encountered in the circuit's operation, i.e., the $t_{on}$ value of the free-running mode to be described hereinafter at minimum input voltage $E_{im}$. Finally, the core that is chosen must have sufficient window area to accommodate both the primary and secondary windings so that the design is physically feasible.

Figure 5:
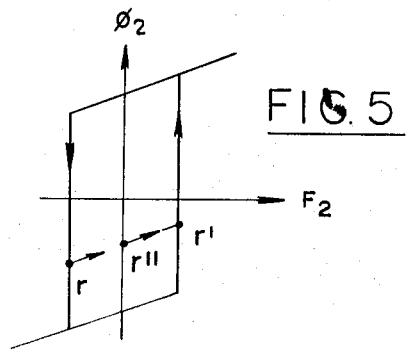
FIG. 5 is a graph showing the flux versus $mmf$ characteristic of a transformer in the multivibrator shown in FIG. 4.
Figure 6:
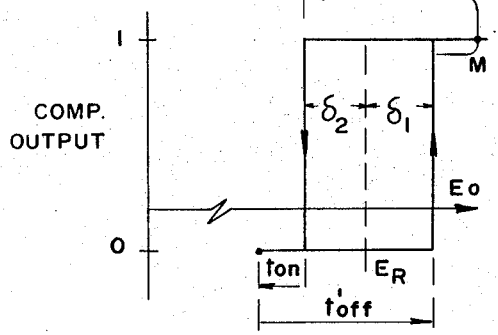
FIG. 6 is a graph showing the hysteresis characteristic of a typical comparator employed in the invention.

A comparator 13 receives a reference dc voltage $E_R$ and compares it with the output $E_o$. As shown in FIG. 6, a binary output signal of the comparator is at a predetermined low level (slightly negative) representing a binary 0 while the output $E_o$ is less than the reference $E_R$ by a small amount $\delta_2$. While the comparator output is low, the multivibrator 12 is turned on via a dc isolation circuit 14 and an ON/OFF control circuit 15. A circuit 16 assures that the multivibrator 12 always starts on the same half cycle so that the flux $\phi_2$ in the core of the transformer $T_2$ initially increases toward positive saturation as shown by the upward pointing arrow on core characteristic diagram of FIG. 5. In this manner the transistor $Q_1$ of the converter 10 will turn on immediately to start the process of transferring power from the source 11 via the energy storage transformer $T_1$ to the capacitor C and the load $R_L$ to boost the voltage across the load $R_L$. The starting circuit 16 is, in practice, designed as an integral part of the inverter 12.

Figure 4:
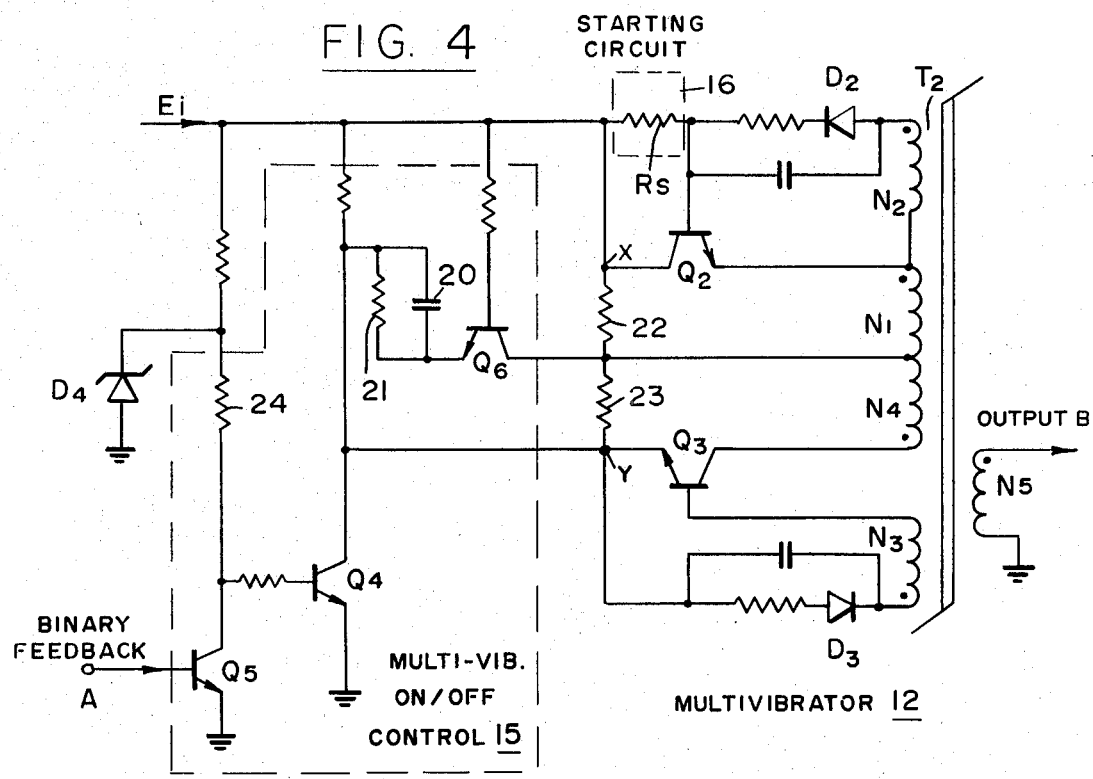
FIG. 4 is a circuit diagram of a preferred implementation of the multivibrator, starting circuit, and multivibrator ON/OFF control of FIG. 1.

The multivibrator 12, ON/OFF control 15 and starting circuit 16 which make up a duty-cycle generator, will now be described with reference to FIG. 4. As noted hereinbefore, the multivibrator is used to generate the controlled base drive to turn the power transistor $Q_1$ (FIG. 1) on and off so that the required time ratio $t_{on}/t_{off}$ can be obtained to maintain the output voltage constant despite changes in $E_t$. It consists of a source of unregulated dc voltage $E_t$ across resistors 22 and 23, and of a squarewave multivibrator comprised of transistors $Q_2$ and $Q_3$, and of transformer $T_2$. The multivibrator is turned on by the ON/OFF control circuit comprised of transistors $Q_4$, $Q_5$ and $Q_6$.

The transistors $Q_2$ and $Q_3$ are connected in a push-pull configuration with saturable transformer $T_2$. In contrast to the transformer $T_1$ of the converter 10 (FIG. 1), which has a linear flux $\phi 1$, versus mmf $F_1$ characteristics, the transformer $T_2$ of the multivibrator has a square-loop flux $\phi_2$ versus $mmf\ F_2$ characteristic as shown in FIG. 5. In further contrast, the core of the transformer $T_2$ is quite small as compared to the core of the transformer $T_1$ because the latter must store substantial energy during each cycle of the converter operation, but the former need not.

Figure 3A:
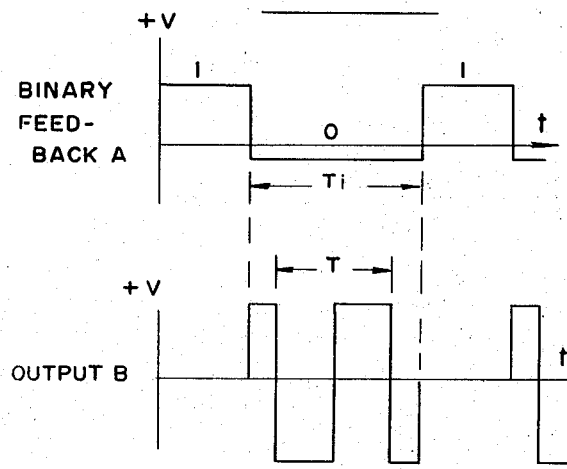
FIG. 3a and 3b are waveforms useful in understanding the operation of the invention.

Assuming that the transistors $Q_4$ and $Q_6$ are on and voltage $E_t$ is impressed across points X and Y, the inverter 12 operates as a free-running oscillator producing a squaarewave voltage across an output winding $N_5$ of the form shown during period T of the waveform B (FIG. 3a). This occurs as the transistors $Q_2$ and $Q_3$ conduct current alternately through respective windings $N_1$ and $N_4$. While one transistor conducts, the other is cutoff.

The saturable transformer $T_2$ is connected with collector windings $N_1$ and $N_4$, and with feedback windings $N_2$ and $N_3$. Conduction of transistor $Q_2$ drives the flux in $T_2$ upward toward positive saturation. This action continues until the flux in core of the transformer $T_2$ reaches positive saturation. The reversal of the winding voltages, precipitated by the saturation of the core of the transformer $T_2$, turns off transistor $Q_2$ but turns transistor $Q_3$ on. Conduction of transistor $Q_3$ resets the flux in the core of transformer $T_2$ downward toward negative saturation.

Voltage is applied to the base of the transistor $Q_2$ through a resistor $R_s$ which serves the function of the starting circuit. When the supply voltage $E_t$ is impressed across the points X and Y, the base current path for turning on the transistor $Q_2$ is thus through resistor $R_s$, the base-emitter junction of that transistor, the primary winding $N_1$, the transistor $Q_6$, and the parallel combination of capacitor 20 and resistor 21 and transistor $Q_4$ to source ground. With transistor $Q_5$ off, the transistors $Q_4$ and $Q_6$ on, point Y is connected to ground through the saturated transistor $Q_4$ while point X is connected to the input voltage $E_i$, either directly or preferably through an emitter-follower regulator shown in FIG. 7.

This arrangement of a starting resistor $R_S$ in the base current path for the transistor $Q_2$ allows it to turn on first when the transistor $Q_4$ and $Q_6$ are first turned on. The starting current in the primary winding $N_1$ induces a voltage (dot positive) across the feedback winding $N_2$ to drive the transistor further into conduction, while it induces a voltage (dot positive) across the feedback winding $N_3$ to hold the transistor $Q_3$ off.

To assist in turning the transistor $Q_2$ on during this starting half cycle, the capacitor provide an initial unbalance of the input voltage across equal resistors 22 and 23 to force transistor $Q_2$ to turn on first whenever power to the multivibrator is initially connected. Capacitor 20 additionally provides the function of a smoothing capacitor for voltage to the two halves of the multivibrator during steady-state operation. Diode $D_2$ in the base circuit of transistor $Q_2$ is used to prevent the starting current from flowing into the low-impedance base-emitter circuit. With this arrangement, transistor $Q_2$ always turns on first to provide a positive base drive to turn power transistor $Q_1$ on whenever power is available from the source and transistor $Q_4$ is on.

A convenient design choice for the circuit in the free-running mode with the core of transformer $T_2$ swinging from positive to negative saturation is to have a duty cycle of around 50 percent, or a $t_{on}/t_{off}$ ratio of approximately unity. Because of the asymetrical half-cycle loading of the multivibrator, i.e., because of the magnetizing current for transformer $T_2$ on one half-cycle and current for the base-emitter circuit of transistor $Q_1$ on the other half cycle, adjustment of resistor 21 through the forward and inverse operation of transistor $Q_6$ can be used to set the ratio of $t_{on}/t_{off}$ by controlling the voltage drops in the primary circuits of the multivibrator and in turn the voltages across windings $N_1$ and $N_4$.

Figure 3B:
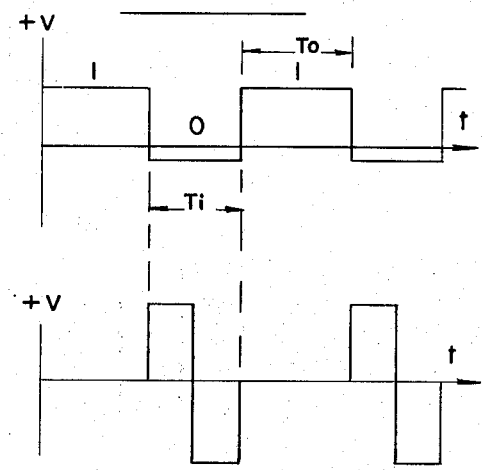

As noted hereinbefore, transistor $Q_4$ is always on when the multivibrator 12 is operating in the free-running mode. That condition prevails until the voltage output $E_o$ has been pumped up through the operation of the transistor $Q_1$ (FIG. 1) by the multivibrator 12. At the time the output voltage $E_o$ exceeds the reference voltage $E_R$ the comparator 13 transmits a high level (binary 1) signal to turn off the multivibrator control 15, i.e., to turn on the transistor $Q_5$ and turn off the transistors $Q_4$ and $Q_6$. That stops the operation of the multivibrator but only for a brief period the duration of which depends upon the load. When the voltage $E_o$ has dropped sufficiently to cause the comparator to transmit a low-level (binary 0) signal, the transistor $Q_5$ will again be turned off and the multivibrator 12 will be restarted. This then is the steady-state mode of operation of the duty-cycle generator with the period $(T_i + T_o)$ shown in FIG. 3b, where $T_o$ is determined by the load.

Once a cycle of operation has progressed until the transistors $Q_1$ and $Q_2$ are off, and the transistor $Q_3$ is on, the flux in the transformer $T_2$ is resetting from its upper saturated level toward its lower saturation level as shown by the arrow pointing down in the diagram of FIG. 5. After some resetting time, when the core flux is at a point $r$ on the square $\phi$–F loop, the transistor $Q_5$ is turned on and the transistor $Q_4$ is then turned off, disconnecting the multivibrator from the source $E_t$. With no voltage impressed across points X and Y, transistor $Q_3$ turns off and both transistors $Q_2$ and $Q_3$ remain off for the interval $T_o$, completing one cycle of operation shown in FIG. 3b. The core of the transformer comes to rest temporarily at point $r''$. For the interval $T_o$ that the transistor $Q_5$ is turned on, the transistor $Q_1$ of the converter (FIG. 1) stays off. The total off time of the transistor $Q_1$ is the sum of the time interval corresponding to the second half cycle of the multivibrator operation (half of time $T_i$ in FIG. 3b) plus the interval $T_o$. In the case of steady-state operation shown in FIG. 3b, only the minor-loop excursions following the dotted line r-r' on the characteristic diagram of FIG. 5 is utilized.

When the transistors $Q_4$ and $Q_6$ are turned on again, the starting circuit 16 causes the transistor $Q_2$ to turn on and another cycle of the duty-cycle generator is repeated. While the transistor $Q_2$ is turned on the flux of the transformer $T_2$ is driven upward from point $r'$. The induced voltage across the output winding $N_s$ is positive during this interval to turn the transistor $Q_1$ on. That transistor will remain on until the flux of the transformer $T_2$ reaches its upper saturation level, completing one half cycle of the multivibrator 12. Then the transistor $Q_3$ turns on and the transistor $Q_2$ turns off, and the flux of the transformer $T_2$ resets as just described hereinbefore.

The time required to drive the flux from the level $r'$ to the upper saturation level is the on time of the transistor $Q_1$ in the converter (FIG. 1). Therefore, it is evident that by control of on time and off time of the transistors $Q_4$ and $Q_6$, the ratio $t_{on}/t_{off}$ of the transistor $Q_1$ is controlled to maintain the output voltage $E_o$ constant despite fluctuations in the input voltage $E_t$ and changes in the load $R_L$.

Once operation has started, the minor-loop flux excursions of the transformer $T_2$ permit the upper limit of converter switching frequency to be extended. Normally a very small core is used to increase the switching frequency of the multivibrator 12, but there is a practical lower limit on the size of the core that can be used. Accordingly, understanding of this minor-loop excursion is important in designing an inverter for a particular application of the present invention.

The comparator is preferably a low-hysteresis variable-threshold circuit, such as a Schmitt-type multivibrator operated as a comparator or a differential amplifier employing a very high gain operational amplifier. The low-hysteresis permits regulating the output voltage to a relatively smooth output voltage. FIG. 6 shows a typical hysteresis characteristic of a binary comparator.

Operation of the comparator is as follows. Assume that the whole converter shown in FIG. 1 is operating in its steady-state mode. The output voltage $E_o$ at the positive (+) input of the comparator is continually compared with the reference voltage $E_r$ at the negative (−) input. When the difference $E_o - E_R$ is positive by an amount slightly greater than $\delta_1$, the comparator output will be a binary 1 (a positive voltage). Similarly, the comparator requires that the difference be negative by another small amount $\delta_2$ before the output is changed from a binary 1 to a binary 0 (a small negative voltage). These quantities $\delta_1$ and $\delta_2$ are very small compared to $E_o$, but are important because, by the very nature of the regulation being effected, the output cannot stabilize precisely at $E_R$, and to average $E_R$ it is necessary to have some comparator circuit hysteresis centered about $E_R$.

Summarizing the theory of operation, when the input voltage is first applied to the converter, the multivibrator 12 operates in its free-running mode to start the converter 10 and causes the output voltage across the load $R_L$ to build up until it reaches the desired regulated output level. The free running mode of the inverter terminates and it enters its steady-state mode the first time that the output voltage exceeds the reference value by $\delta_1$. The binary comparator then comes into play, and the converter moves into steady-state operation. The behavior of the complete regulated converter under steady-state conditions is now explained by considering one complete cycle of operation.

Let the steady-state mode begin with the turning on of transistor $Q_1$ due to the turning on of transistors $Q_2$ and $Q_4$. The input voltage $E_t$ is impressed across winding $N_p$ and drives the flux in transformer $T_1$, as shown on the linear $\phi$–F characteristic of FIG. 2, from point b toward point a. Meanwhile, the conduction of transistor $Q_2$ causes the flux in transformer $T_2$, as shown on the square $\phi$–F characteristic of FIG. 5, to increase from point $r'$ toward positive saturation. While transistor $Q_1$ conducts, diode $D_1$ is reverse biased and no current can flow in winding $N_S$. The output capacitor C which was charged during previous cycles now supplies the load. The output voltage $E_o$ falls according to the $R_LC$ time constant. The bistable comparator during this period of time is at its digital-zero state because the output voltage $E_o$ in this time interval, referring to FIG. 6, is below the lower threshold level of the comparator. These conditions continue until the flux in transformer $T_2$ reaches positive saturation. At this time, the flux in transformer $T_1$ has reached point $a$. The reversal of the winding voltages of the multivibrator, precipitated by the saturation of transformer $T_2$, turns transistors $Q_2$ and $Q_1$ off but turns transistor $Q_3$ on. The time required to drive the flux in transformer $T_2$ from $r'$ to the upper saturation level varies depending on the input voltage magnitude. However, it is always true that this time interval establishes and is equal to the conduction time, or the on-time $t_{on}$ of transistor $Q_1$. It also can be seen from FIG. 6 that the output voltage dips to a minimum at the end of the $t_{on}$ time interval. This ends the first half-cycle of converter operation.

The second half-cycle begins with the turning on of transistor $Q_3$ and the turning off of transistors $Q_1$ and $Q_2$. Conduction of transistor $Q_3$ causes the flux in transformer $T_2$ to be reset from positive saturation downward toward negative saturation while the cut-off of transistor $Q_1$ causes a discharge of energy stored in transformer $T_1$ to the output capacitor C and the load $R_L$ by means of secondary-winding current $i_s$. Because of the ample current supply from transformer $T_1$ during the beginning portion of the transistor $Q_1$ off interval, the output voltage $E_o$ begins to rise and, after a period of charging time $t'_{off}$, exceeds the upper threshold of the bistable comparator. Having been triggered by the higher-than-reference output voltage, the compatator changes its state from a binary zero to a binary one and turns transistor $Q_5$ on. The conduction of transistor $Q_5$ cuts $Q_4$ off. As previously explained the turning off of transistor $Q_4$ interrupts the resetting flux in transformer $T_2$ at point $r$ and the flux comes to rest at the point $r''$. The multivibrator 12 will stay in this idle state for as long as transistor $Q_4$ is off, which is the rest part of the second half-cycle, and corresponds to the time interval $t''_{off}$ shown in FIG. 6. As to the power transistor $Q_1$, it continues to stay off with zero bias voltage across winding $N_5$ until the next cycle starts.

During the interval $t''_{off}$ that the transistor $Q_4$ is off, the output voltage $E_o$ rises higher than the upper threshold until the decreasing current $i_s$ is just enough to supply only the load. The output voltage $E_o$ then is at a maximum as shown in FIG. 6 by the point M. The output voltage starts to decrease from now on because part of the load current has to be supplied by the capacitor C. As time goes by, the output voltage $E_o$ finally drops down to the comparator lower-threshold level and causes the comparator to change its state from a binary one to a binary zero. This comparator action cuts transistor $Q_5$ off and lets transistor $Q_4$ turn on again. At this moment, the flux level in transformer $T_1$ has returned to its original starting point $b$ in FIG. 2. With the turning on of transistors $Q_4$, $Q_2$ and $Q_1$, the second half-cycle ends and the description of one full cycle of converter steady-state operation is completed.

The binary output of the comparator is coupled to the multivibrator ON/OFF control circuit by a feedback isolation circuit 14, as noted hereinbefore. That isolation circuit may be comprised of a pulse transformer. The use of a pulse transformer in the feedback path to transfer binary information concerning the state of the output voltage, and at the same time to provide isolation, operates quite well when the operating frequency is reasonably high. As the operating frequency decreases, the physical size of the transformer and the required magnetizing current may become objectionably large. In that case, for low-frequency operation, an isolation circuit employing a light emitting diode and a photo diode works well.

Figure 7:
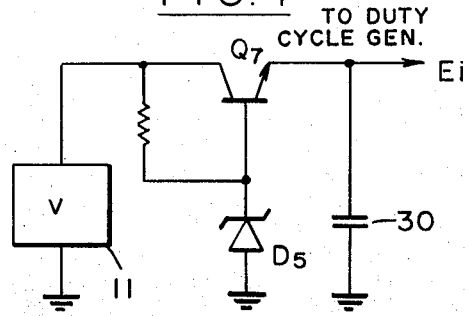
FIG. 7 is a circuit diagram of an emitter follower regulator useful in regulating power from an unregulated voltage source for use in operating the circuits of FIG. 4.

It is evident that the multivibrator 12 is operating with a power supply from the unregulated voltage source 11. However, an emitter-follower regulator, as shown in FIG. 7, can be added to power the duty-cycle generator for the following two advantages: to reduce the input source voltage to a lower level so that the breakdown voltages of available very-fast-switching transistors will not be exceeded; and to reduce the power loss in the magnetically coupled multivibrator from a second-power function of voltage level to a first-power one. The latter occurs because a multivibrator of this type is essentially a voltage feedback device. That regulator is connected between the source 11 of unregulated voltage and both the multivibrator 12 and ON/OFF control 15. Zener diode $D_5$ regulates the conduction of a transistor $Q_7$ connected in an emitter-follower configuration through a capacitor 30 which smooths the voltage $E_i$.

Figure 8:
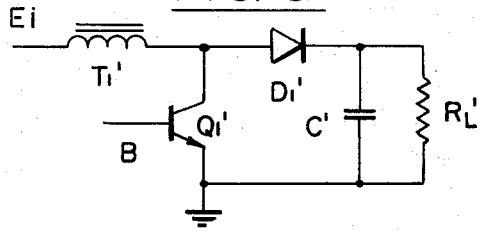
FIG. 8 illustrates a single-winding step-up flyback converter for use in a second embodiment of the invention.
Figure 9:
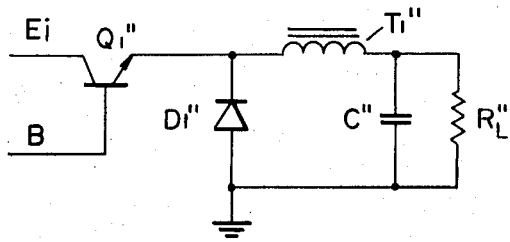
FIG. 9 illustrates a single-winding step-down flyback converter for use in a second embodiment of the invention.

FIGS. 8 and 9 show two other basic inductive-energy storage configurations which may be used with a duty-cycle generator and comparator to form a closed loop regulated voltage step-up (FIG. 8) or step-down (FIG. 9) dc-to-dc converter. Elements in FIGS. 8 and 9 corresponding to elements in the two-winding converter configuration of FIG. 1 are identified by the same reference characters, but distinguished by primes and double primes. By properly adjusting the conducting time $t_{on}$ of the power transistor $Q_1''$, and the cut-off time $t_{off}$, the converter of FIG. 9 steps down the input voltage $E_i$ to a constant voltage $E_o$. In the converter of FIG. 8, the ratio of $t_{on}$ to $t_{off}$ is again controlled to step up the input voltage $E_i$ to $E_o$. In each of the three converter configurations disclosed, there is inductive energy storage. These configurations present less transistor storage-time problems and require only one power transistor, which suggest the potential of higher converter reliability. In the step-up configuration of FIG. 8, the steady state output $E_o$ is given by the equation $$E_O = (1 + t_{on}/t_{off}) E_i$$

(5)

In the step-down configuration of FIG. 9, the output $E_o$ is given by the equation $$E_o = t_{on}/(t_{on} + t_{off})E_i$$

(6)

Equations (1), (5) and (6) thus show ideal steady-state input-output relationships for the three converter configurations disclosed. One of these three configurations should be able to meet the voltage-transformation needs for most requirements. The configuration of FIG. 1 (Equation 1) is preferred, however, because it is capable of both stepping up and stepping down an unregulated input voltage to a constant output voltage by automatic adjustment of the ratio of $t_{on}$ to $t_{off}$.

Although particular embodiments of the invention have been described and illustrated herein, it is recognized that modifications and variations may readily occur to those skilled in the art, such as providing additional output windings for a converter with multiple output voltages. Regulation of one makes all others stable, except for variable load conditions unique to each voltage output. It is therefore intended that the claims be interpreted to cover such modifications and variations.

What is claimed is:

1. In a generator for producing a predetermined duty-cycle square wave with a natural oscillation period in response to a binary signal, wherein said binary signal is variable as to the preiod during which it is at its first level, and said period may be greater than or less than the period of one cycle of natural oscillation of said oscillator, the combination of a source of dc voltage, said source having one terminal connected to circuit ground, an oscillator comprised of two switching transistors connected in a push-pull multivibrator configuration between two terminals to two primary windings of a transformer having an output winding across which said square wave is induced, and a regenerative feedback winding to each of said switching transistors, said transformer being comprised of a core having a square-loop flux versus mmf characteristic, whereby said switching transistors conduct alternately when dc voltage is applied to said switching transistors from said source to induce said alternating signal in said output winding, one of said two terminals of said oscillator being connected to said circuit ground, said oscillator including means for operation with a minor-loop flux excursion in said transformer with flux saturation of one polarity at the beginning of one cycle of said oscillator and flux at a lower level of opposite polarity at the end of one cycle of said oscillator during steady state operation, means connected to one of said switching transistors to cause it to conduct first whenever dc voltage is applied to said switching transistors, whereby said alternating signal always starts with a half-cycle of predetermined polarity, said predetermined polarity being selected to turn said electronic power switch on, control means responsive to said binary signal for applying dc voltage to said switching transistors when said binary signal is at a first predetermined level, and removing said dc voltage when said binary signal is at a second predetermined level, thereby providing a duty cycle generator for controlling the on and off condition of said oscillator, said control means being comprised of first and second cascaded transistors each having a base, an emitter and a collector, said collector of each being couped to said source of dc voltage and said emitter of each being connected to said circuit ground, the base of said first cascaded transistor being connected to receive said binary signal and the collector of said second cascaded transistor being connected to the other of said two terminals of said oscillator, whereby said oscillator is turned on while said first cascaded transistor is on, and turned off while said first cascaded transistor is off, and said minor-loop flux excursion means being comprised of a third transistor having an emitter connected to the collector of said second cascaded transistor through a resistor and capacitor in parallel, a base connected to said source of dc voltage, and a collector connected to a center point between said two switching transistors connected in a push-pull multivibrator configuration such that, when said second cascaded transistor is turned off, said third transistor is turned off to remove operating bias voltage from said two switching transistors to assure that both turn off and remain off, whereby said oscillator has the potential of very high operation frequency during steady state operation.

2. The combination of claim 1 including
an unregulated inductive energy storage dc-to-dc converter having an inductive energy storage means and an electronic power switch to turn current on and off through said inductive energy storage means from a source of unregulated dc voltage, and thereby producing a regulated dc output voltage applied to a load, means coupling said output winding of said oscillator to said power switch to thereby alternately turn current on and off through said inductive energy storage means, means having two input terminals and one output terminal for receiving a dc reference voltage, a second terminal connected to said inductive-energy-storage converter to receive said dc output voltage for comparing said dc output voltage with said dc reference voltage, said comparing means producing said binary signal at said first predetermined level when said dc output voltage exceed said dc reference voltage and at said second predetermined voltage level when said dc output voltage does not exceed said dc reference voltage.

3. The combination of claim 2 wherein said unregulated inductive energy storage dc-to-dc converter is a two-winding inductive-energy converter.

4. The combination of claim 2 wherein said unregulated inductive energy storage dc-to-dc converter is a singe-winding flyback converter.

5. The combination of claim 2 including means for dc isolation of said comparing means from said first cascaded transistor of said duty-cycle generator.

6. The combination of claim 5 including means for regulating voltage from said dc voltage source to said duty-cycle generator.

* * * * *